United States Patent
Matsunaga

(10) Patent No.: US 8,401,725 B2
(45) Date of Patent: Mar. 19, 2013

(54) TARGET ROUTE SETTING SUPPORT SYSTEM

(75) Inventor: Shinichi Matsunaga, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 356 days.

(21) Appl. No.: 12/747,088

(22) PCT Filed: Oct. 22, 2008

(86) PCT No.: PCT/JP2008/002986
§ 371 (c)(1),
(2), (4) Date: Jun. 9, 2010

(87) PCT Pub. No.: WO2009/075051
PCT Pub. Date: Jun. 18, 2009

(65) Prior Publication Data
US 2010/0274431 A1    Oct. 28, 2010

(30) Foreign Application Priority Data
Dec. 10, 2007   (JP) .................................. 2007-318964

(51) Int. Cl.
*G01C 22/00*   (2006.01)

(52) U.S. Cl. ........................................................ 701/26

(58) Field of Classification Search ...................... 701/26
See application file for complete search history.

(56) References Cited

U.S. PATENT DOCUMENTS
2006/0149465 A1   7/2006   Park et al.
2006/0155436 A1   7/2006   Matsunaga

FOREIGN PATENT DOCUMENTS

| JP | 61-240306 | 10/1986 |
|---|---|---|
| JP | 03-002909 | 1/1991 |
| JP | 03-166076 | 7/1991 |
| JP | 06-168026 | 6/1994 |
| JP | 07-262497 | 10/1995 |
| JP | 09-230933 | 9/1997 |
| JP | 09-298905 | 11/1997 |
| JP | 2003-187399 | 7/2003 |
| JP | 2006-185438 | 7/2006 |
| JP | 2006-259963 | 9/2006 |
| JP | 2007-257274 | 10/2007 |

* cited by examiner

OTHER PUBLICATIONS

Chen et al ("Qualitative Vision-Based Mobile Robot Navigation"; IEEE International Conference on Robotics and Automation (ICRA); May 2006). Retreived from http://www.ces.clemson.edu/~stb/publications/qualitative_navigation_icra2006.pdf.*

*Primary Examiner* — Thomas Tarcza
*Assistant Examiner* — Maceeh Anwari
(74) *Attorney, Agent, or Firm* — Rankin, Hill & Clark LLP

(57) ABSTRACT

A target route setting support system is equipped with a transiting area/starting-terminal point recognizing unit, a route candidate generating unit, and a determining unit. The transiting area/starting-terminal point recognizing unit recognizes a node or a link connecting nodes together designated by the user via a remote controller as a designated transiting area, the target position as a terminal point, and a departure position as a starting point. The route candidate generating unit generates a moving route candidate connecting the terminal point and the starting point so the designated transiting area is included at least in a part of the moving route candidate. The determining unit determines the level of a possibility of contact between the robot and an object in the case where the robot is made to move along the moving route candidate, and outputs the determination result via an output device.

19 Claims, 8 Drawing Sheets

TARGET ROUTE SETTING SUPPORT SYSTEM

BACKGROUND OF THE INVENTION

1. Technical Field

The present invention relates to a target route setting support system for supporting a user in setting a target route for a robot autonomously moving along the target route.

2. Description of the Related Art

Conventionally, as this type of target route setting support system, there is known one equipped with a map management unit which stores a node and a link connecting the nodes as a transiting point of an autonomous mobile robot, an input unit for inputting a starting point as a departure position of the robot and a terminal point as a target position thereof, and a route generating unit which generates a target route, when the starting point and the terminal point are provided by the input unit, from searching the nodes and the links stored in the map management unit (refer to Japanese Patent Laid-Open No. 2006-259963).

In such conventional target route setting support system, the nodes and the links includes information on objects such as obstacles related thereto, and the target route for moving from the starting point to the terminal point while avoiding the objects is automatically set.

However, in the conventional target route setting support system, the target route avoiding the objects is set automatically, and it is difficult to make the target route pass the points desired by the user.

On the other hand, when the target route passing the points desired by the user is set, there are cases where the possibility of contact between the robot and the object increases, when the robot is made to move along the target route.

SUMMARY OF THE INVENTION

In view of the above circumstances, an object to be solved by the present invention is to provide a system which is capable of making a robot move while transiting points desired by a user as much as possible, to the extent that the robot avoids contact with the object.

According to a first aspect of the present invention, there is provided a target route setting support system for supporting an user in setting a target route for a robot autonomously moving according to the target route, the system comprising: a first storing unit which stores a position of a plurality of nodes preliminarily set in a moving region of the robot; a second storing unit which stores information related to a position and an existence range of an object in the moving region of the robot; a starting point recognizing unit which recognizes a current position or a departure position of the robot in the moving region as a starting point; a terminal point recognizing unit which recognizes a target position of the robot in the moving region designated by the user via an input device as a terminal point; a transiting area recognizing unit which recognizes, of a plurality of nodes stored in the first storing unit, the node or a link connecting the nodes together which is designated by the user via the input device as a designated transiting area; a route candidate generating unit which generates a moving route candidate connecting the terminal point recognized by the terminal point recognizing unit and the starting point recognized by the starting point recognizing unit, so as to include the designated transiting area recognized by the transiting area recognizing unit at least in a part thereof; and a determining unit which determines a level of or an existence or nonexistence of a possibility of contact between the robot and the object, in the case where the robot is made to move along the moving route candidate generated by the route candidate generating unit, in light of information concerning the position and the existence range of the object stored in the second storing unit, and which outputs the determination result via an output device; wherein the moving route candidate generated by the route candidate generating unit is allowed to be set as the target route, on condition that it is determined by the determining unit that the possibility of contact is low or there is no possibility of contact.

According to the target route setting support system of the first aspect of the invention, the moving route candidate including the designated transiting area designated by the user is generated. Thereafter, the level of or the existence or nonexistence of the possibility of contact between the object and the robot is determined with respect to the moving route candidate, and the determination result thereof is output via the output device, so that the user may realize the level of or the existence or nonexistence of the possibility of contact with the object when the robot is made to move along the moving route candidate by the user. Thereafter, the user is allowed to set the moving route candidate as the target route, only in the case where it is determined by the system that the possibility of contact is low or there is no possibility of contact. Therefore, it becomes possible to make the robot move along the target route while transiting the points desired by the user as much as possible, to the extent that the robot avoids contact with the object.

The target route setting support system of a second aspect of the invention is the target route setting support system of the first aspect of the invention, wherein the determining unit determines that the possibility of contact is high, when the moving route candidate generated by the route candidate generating unit intersects with an object region defined by the existence range of the object at the position of the object stored in the second storing unit.

According to the target route setting support system of the second aspect of the invention, it is determined that the possibility of contact with the object with respect to the moving route candidate including the designated transiting area designated by the user is high, in the case where the moving route candidate intersects with an object region. Thereafter, in the case where it is determined by the system that the possibility of contact is high, the user is not allowed to set the moving route candidate as the target route. Therefore, it becomes possible to avoid contact between the robot and the object.

The target route setting support system of a third aspect of the invention is the target route setting support system of the first aspect of the present invention, wherein the determining unit presents an intersecting position between the moving route candidate and the object region, when it is determined that the possibility of contact is high.

According to the target route setting support system of the third aspect of the invention, in the case where it is determined that the possibility of contact with the object with respect to the moving route candidate including the designated transiting area designated by the user is high, the intersecting position between the moving route candidate and the object region is presented as the determination result. Therefore, the user may realize the position where the possibility of contact with the object is high, when the robot is made to move along the moving route candidate. Further, in the case where it is determined by the system that the possibility of contact is high, the user is not allowed to set the moving route candidate as the target route, so that it is possible to urge a change of the designated transiting area and the like. Therefore, it becomes possible to avoid contact between the robot and the object.

The target route setting support system of a fourth aspect of the invention is the target route setting support system of the second aspect of the invention, wherein the system further comprises a recommended route generating unit which generates a recommended moving route connecting the terminal point recognized by the terminal point recognizing unit and the starting point recognized by the starting point recognizing unit, so as to avoid the intersecting position between the moving route candidate and the object region, and also to include the designated transiting area recognized by the transiting area recognizing unit as much as possible, in place of the moving route candidate, when it is determined by the determining unit that the possibility of contact is high.

According to the target route setting support system of the fourth aspect of the invention, the recommended moving route is generated so as to avoid the intersecting position between the moving route candidate and the object region, and also to include the designated transiting area designated by the user as much as possible, in the case where it is determined that the possibility of contact with the object with respect to the moving route candidate including the designated transiting area designated by the user is high. Thereafter, the user may set the recommended moving route as the target route, and make the robot move along the target route. Therefore, it becomes possible to make the robot move along the target route while transiting the points desired by the user as much as possible, to the extent that robot avoids contact with the object.

The target route setting support system of a fifth aspect of the invention is the target route setting support system of the first aspect of the invention, wherein the system further comprises a third storing unit which stores an existence range of the robot, and the determining unit sets a determining region having an existence range corresponding to the existence range of the robot stored in the third storing unit along the moving route candidate, and determines that there is a possibility of contact, when the determining region overlaps with the object region defined by the existence range of the object at the position of the object stored in the second storing unit.

According to the target route setting support system of the fifth aspect of the invention, the determining region having the existence range corresponding to the existence range of the robot is set, with respect to the moving route candidate including the designated transiting area designated by the user, and it is determined that there is possibility of contact with the object, in the case where the determining region overlaps with the object region. Thereafter, the user is allowed to set the moving route candidate as the target route, only in the case where it is determined by the system that the possibility of contact is low or there is no possibility of contact. Therefore, it becomes possible to make the robot move along the target route while transiting the points desired by the user as much as possible, to the extent that robot avoids contact with the object.

The target route setting support system of a sixth aspect of the invention is the target route setting support system of the fifth aspect of the invention, wherein the determining unit determines, in the case where it is determined that there is a possibility of contact, the possibility of contact to be high when the moving route candidate generated by the route candidate generating unit intersects with the object region, and determines the possibility of contact to be low when the two does not intersect.

According to the target route setting support system of the sixth aspect of the invention, it is determined that the possibility of contact between the robot and the object is high in the case where the robot is made to move along the moving route candidate, when the moving route candidate intersects with the object region. On the other hand, it is determined that the possibility of contact is low, when the determining region overlaps with the object region but the moving route candidate does not intersect with the object region. Thereafter, the user is allowed to set the moving route candidate as the target route, only in the case where it is determined by the system that the possibility of contact is low or there is no possibility of contact. Therefore, it becomes possible to make the robot move along the target route while transiting the points desired by the user as much as possible, to the extent that robot avoids contact with the object.

The target route setting support system of a seventh aspect of the invention is the target route setting support system of the fifth aspect of the invention, wherein the determining unit presents an overlapping position between the determining region and the object region, when it is determined that there is a possibility of contact.

According to the target route setting support system of the seventh aspect of the invention, in the case where it is determined that there is a possibility of contact with the object with respect to the moving route candidate including the designated transiting area designated by the user, the overlapping position between the determining region and the object region is presented as the determination result. Therefore, the user may realize the position where there is the possibility of contact with the object, when the robot is made to move along the moving route candidate. Further, in the case where it is determined by the system that there is the possibility of contact, the user is not allowed to set the moving route candidate as the target route. Therefore, it becomes possible to avoid contact between the robot and the object.

The target route setting support system of an eighth aspect of the invention is the target route setting support system of the fifth invention, wherein the determining unit is equipped with a recommended route generating unit which generates a recommended moving route connecting the terminal point recognized by the terminal point recognizing unit and the starting point recognized by the starting point recognizing unit, so as to avoid the overlapping position between the determining region and the object region, and also to include the designated transiting area recognized by the transiting area recognizing unit as much as possible, in place of the moving route candidate, when it is determined that there is a possibility of contact.

According to the target route setting support system of the eighth aspect of the invention, the recommended moving route is generated so as to avoid the overlapping position between the determining region and the object region, and also to include the designated transiting area designated by the user as much as possible, in the case where it is determined that there is a possibility of contact with the object with respect to the moving route candidate including the designated transiting area designated by the user. Thereafter, the user may set the recommended moving route as the target route, and make the robot move along the target route. Therefore, it becomes possible to make the robot move along the target route while transiting the points desired by the user as much as possible, to the extent that robot avoids contact with the object.

The target route setting support system of a ninth aspect of the invention is the target route setting support system of the fifth aspect of the invention, wherein the determining region is a region having a first predetermined width along the moving route candidate, and the first predetermined width is variably set in accordance with a changing pattern of a moving velocity of the robot.

According to the target route setting support system of the ninth aspect of the invention, a region having the first predetermined width along the moving route candidate is set as the determining region, with respect to the moving route candidate including the designated transiting area designated by the user, and it is determined that there is a possibility of contact with the object in the case where the determining region overlaps with the obstacle region. The first predetermined width is set variably in accordance with the changing pattern of the moving velocity of the robot, so that it becomes possible to determine the possibility of contact in harmony with the actual moving condition of the robot. Thereafter, the user is allowed to set the moving route candidate as the target route, only in the case where it is determined by the system that the possibility of contact is low or there is no possibility of contact. Therefore, it becomes possible to make the robot move along the target route while transiting the points desired by the user as much as possible, to the extent that robot avoids contact with the object.

The target route setting support system of a tenth aspect of the invention is the target route setting support system of the fifth aspect of the invention, wherein the determining region is a region having a second predetermined width in a direction orthogonal to the moving route candidate, and the second predetermined width is variably set in accordance with a swinging width in a traverse direction of the robot.

According to the target route setting support system of the tenth aspect of the invention, a region having the second predetermined width in a direction orthogonal to the moving route candidate is set as the determining region, with respect to the moving route candidate including the designated transiting area designated by the user, and it is determined that there is a possibility of contact with the object in the case where the determining region overlaps with the obstacle region. The second predetermined width is set variably in accordance with the swinging width of the robot in the lateral direction thereof, so that it becomes possible to determine the possibility of contact in harmony with the actual moving condition of the robot. Thereafter, the user is allowed to set the moving route candidate as the target route, only in the case where it is determined by the system that the possibility of contact is low or there is no possibility of contact. Therefore, it becomes possible to make the robot move along the target route while transiting the points desired by the user as much as possible, to the extent that robot avoids contact with the object.

DETAILED DESCRIPTION OF THE PREFERRED EMBODIMENTS

An embodiment according to the present invention will now be explained below with reference to FIG. 1 through FIG. 8.

Figure 1:
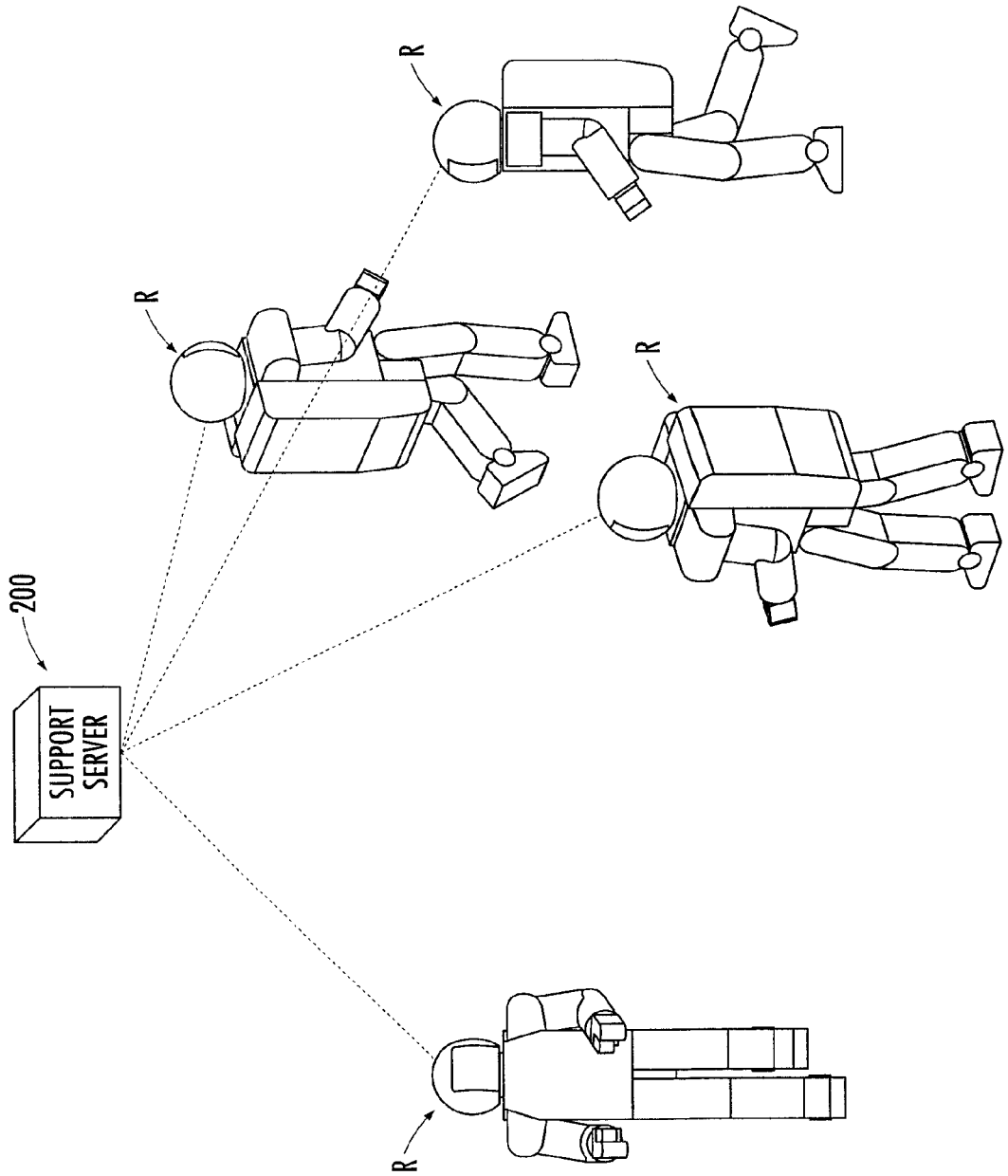
FIG. 1 is an explanatory view of the configuration of a target route setting support system of the present embodiment.

As is shown in FIG. 1, a target route setting support system of the present invention is configured from a robot R and a support server 200.

Figure 2:
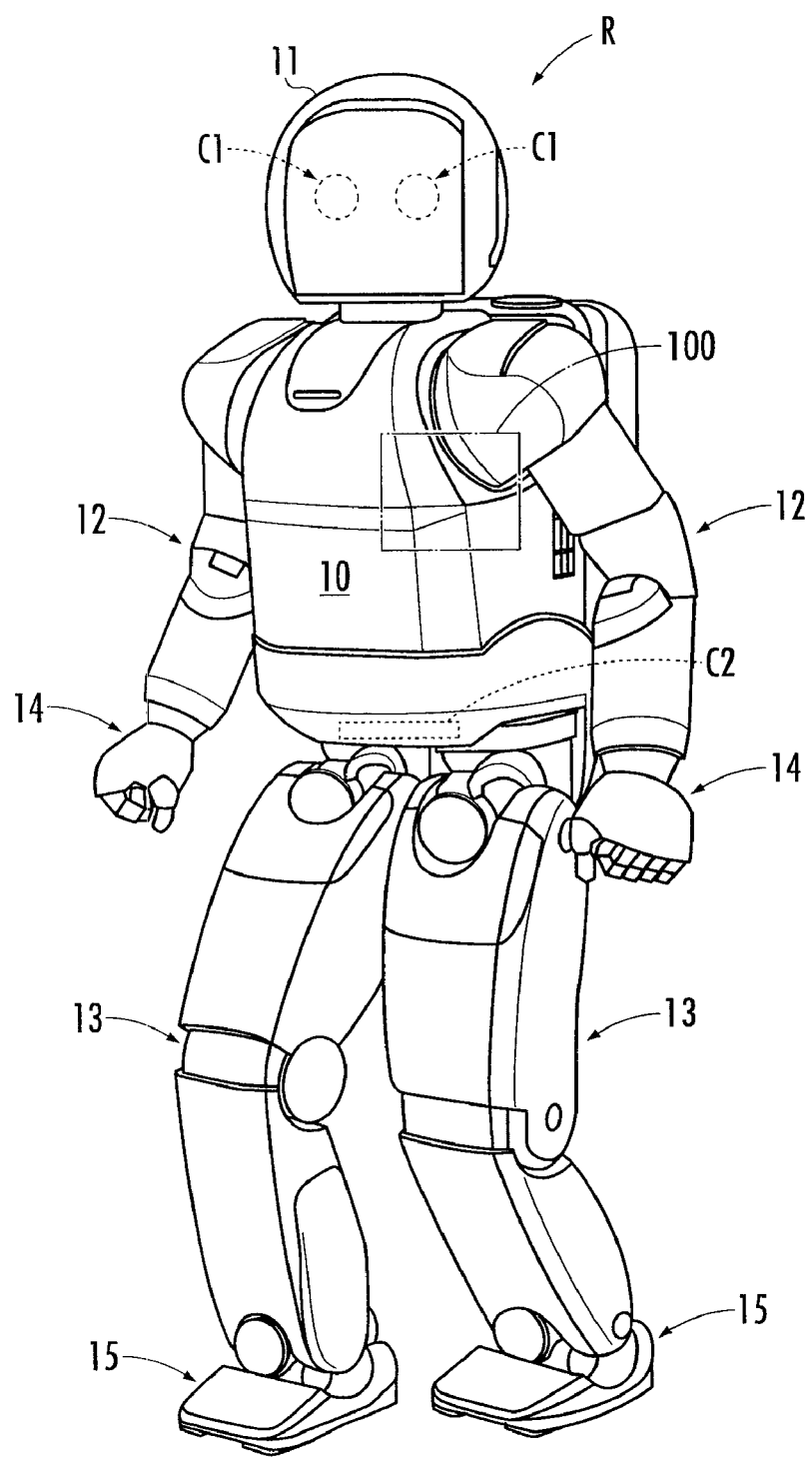
FIG. 2 is an explanatory view of the configuration of a robot.

As illustrated in FIG. 2, the robot R is equipped with a main body 10, a head 11 disposed at the top of the main body 10, a pair of left and right arms 12 extended from upper left and right sides of the main body 10, a hand 14 provided to the leading end portion of each arm 12, a pair of left and right legs 13 extended downwardly from the lower portion of the main body 10, and a foot 15 attached to the leading end portion of each leg 13. As disclosed in Japan Domestic re-publication of PCT international applications 2003-090978 and 2003-090979, according to a force transmitted from an actuator 1000 (refer to FIG. 2), the robot R is capable of bending and stretching the arms 12 or the legs 13 at a plurality of joints respectively corresponding to a plurality of joints of a human being, such as the shoulder joint, the elbow joint, the wrist joint, the hip joint, the knee joint and the ankle joint. The robot R is capable of moving autonomously by a movement involving repetition of lifting and landing each of the left and right legs 13 (or feet 15) from the floor. The height of the head 11 may be adjusted by adjusting the inclination angle of the main body 10 with respect to the vertical direction thereof. The head 11 is mounted with a pair of head cameras (CCD camera) C1. The pair of head cameras C1 are disposed laterally, facing ahead of the robot R. The main body 10 is mounted with a waist camera (an infrared camera) C2 disposed lower front. The robot R may be the robot R autonomously moving by the operation of a plurality of the legs 13, or may be any other device having moving function, such as a wheel-type moving robot (automobile) or the like.

The robot R is provided with a controller 100 and a communication device 102. The controller 100 is composed of an ECU or a computer (including a CPU, a ROM, a RAM, an I/O and the like) as a hardware. In a memory of the computer, a control program (software) is stored. The control program may be installed in the computer through the intermediary of a software-recording medium such as a CD or DVD, or may be downloaded to the computer from a server through the intermediary of a network or a satellite according to a request signal sent to the server from the robot R.

Figure 3:
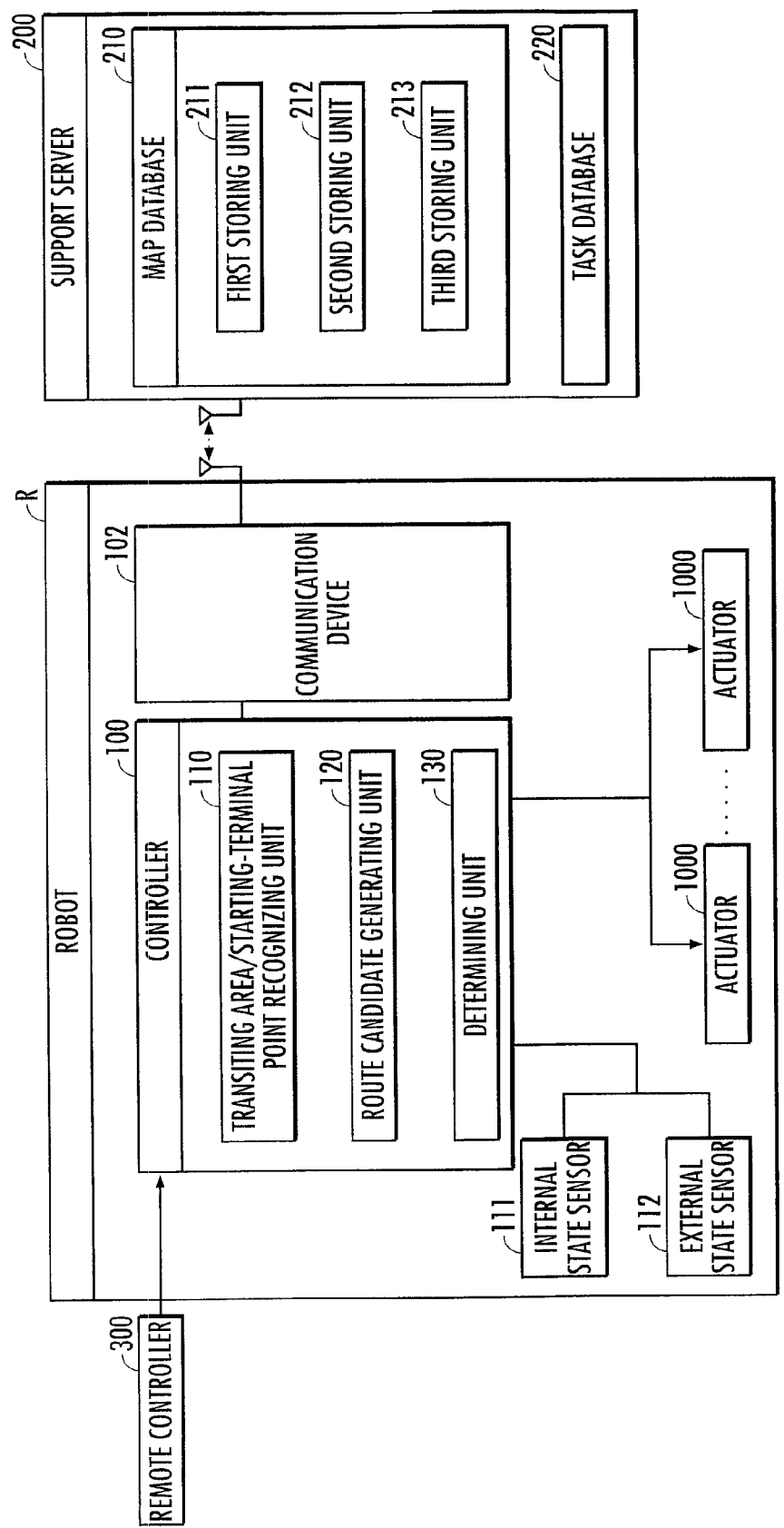
FIG. 3 is an explanatory view of the configuration of a controller of the robot and a support server.

As shown in FIG. 3, the controller 100 controls the motions of the arms 12 or the legs 13 through controlling the operations of actuators 1000 according to output signals from an internal state sensor 111 and an external state sensor 112 and the like. The internal state sensors 111 are sensors for measuring an internal state or a behavior of the robot R. Various sensors mounted in the robot R, such as a gyro sensor which outputs signals according to the acceleration of the main body 10, a rotary encoder which outputs signals according to joint angles of each joint, and a force sensor which outputs signals according to a floor reaction force applied to the legs 13, correspond to the internal state sensor 111. The external state sensor 112 is a sensor for measuring an external state or environment of the robot R, such as a behavior or the like of an object. The head cameras C1, the waist camera C2 and the like correspond to the external state sensor 112. In addition to a driving source such as an electric motor, the actuator 1000 is configured from a reduction gear disposed between an output shaft of the driving source and a link constituting the arm 12 or the leg 13, or a flexible element such as an elastic member.

The controller 100 is configured to be capable of performing wireless communication or wired communication between a remote controller (corresponding to an input device and an output device of the present invention) 300 as a user terminal. The remote controller 300 is a personal computer terminal provided with an input device such as a keyboard or a touch panel, and a monitor such as a liquid crystal display. By operating the remote controller 300, a user is capable of setting a target position of the robot R, nodes or links as a designated transiting area, or a departure position of the robot R if the departure position is not the present position, in a moving region of the robot R. Thus, the remote controller 300 can be used as a user interface for remote controlling the robot R such as initiating and stopping of the robot R, restoring the robot R to the original point or the like according to instructions from the user. It can also be used in monitoring the motion state of the robot itself such as displaying images from the head camera C1 and the like.

The controller 100 is equipped with a transiting area/starting-terminal point recognizing unit 110, a route candidate generating unit 120, and a determining unit 130.

The transiting area/starting-terminal point recognizing unit 110 recognizes a node or a link connecting the nodes together designated by the user via the input device as the designated transiting area. Further, the transiting area/starting-terminal point recognizing unit 110 recognizes, when the target position to which the robot R should reach along the moving route is designated, the target position as the terminal point. Similarly, in the case where the departure position of the robot R is designated, the departure position is recognized as the starting point. In the case where the departure position of the robot R is not designated, then the current position of the robot R is recognized as the starting point.

In the case where the target position is not designated by the user, the transiting area/starting-terminal point recognizing unit 110 may recognize the designated transiting area which is lastly designated by the user, or which is farthest from the departure position (current position), as the target position.

The route candidate generating unit 120 generates a moving route candidate connecting the terminal point and the starting point, so as to include the designated transiting area recognized by the transiting area/starting-terminal point recognizing unit 110 at least in a part thereof. In the case where the nodes or the links recognized as the designated transiting area by the transiting area/starting-terminal point recognizing unit 110 constitutes the entire route connecting the terminal point and the starting point, then such route is set as the moving route candidate. On the other hand, in the case where the nodes and the links constitute a part of the route connecting the terminal point and the starting point, the route which includes all of the nodes and the nodes included in the links and which is the shortest route is set as the moving route candidate.

The controller 100 does not have a map database which stores information concerning the nodes or the links in the moving region of the robot R, however, the controller 100 arbitrarily obtains information concerning the nodes stored in a first storing unit 211 of the support server 200 to be explained later. On the basis of the obtained information, the transiting area/starting-terminal point recognizing unit 110 recognizes the designated transiting area, the starting point or the terminal point, and the route candidate generating unit 120 generates the moving route candidate connecting the starting point and the terminal point and including the transiting area.

The determining unit 130 sets a determining region which corresponds to the moving route candidate generated by the route candidate generating unit 120, and determines, on the basis of the determining region, the existence or nonexistence of a possibility of contact between any object existing inside the moving region and the robot R, in the case where the robot R is made to move. Further, the determining unit 130 determines the level of the possibility of contact between any object existing in the moving region and the robot R, for the moving route candidate generated by the route candidate generating unit 120.

The determining unit 130 does not have a storing unit which stores information concerning the object, however, the determining unit 130 arbitrarily obtains information concerning the object stored in a second storing unit 212 of the support server 200 to be explained later, and determines the possibility of contact between the robot R and the object.

The support server (configured from a CPU, a ROM, a RAM, an I/O and the like) 200 has a function of communicating with the robot R via a base station (not shown) and a communication network.

The support server 200 is equipped with a map database 210 and a task database 220. The map database 210 stores the map data stating the arrangement of the nodes, objects and the like preliminarily set in the moving region of the robot R.

Specifically, the map database 210 is equipped with the first storing unit 211, the second storing unit 212, and a third storing unit 213. The first storing unit 211 stores the position of a plurality of the nodes preliminarily set as a transiting area candidate in the moving region of the robot R. The second storing unit 212 stores information concerning the position and an existence range of the object in the moving region of the robot R. The object includes fixed objects as obstacles, and also sections inappropriate for the activity of the robot R, such as the installation site of an electric transformer or the vicinity of a heat generator. The third storing unit 213 stores the existence range of the robot R in the anteroposterior direction, the lateral direction, and the vertical direction.

On the other hand, the task database 220 stores task information representing the contents of each of a plurality of tasks. The stored task information includes a correction amount for correcting the existence range of the robot R stored in the third storing unit according to the content of the task.

Next, with reference to FIG. 4, the processing in the target route setting support system of the above-described configuration will be explained.

First, when the user designates the nodes or links as the target position and the designated transiting area of the robot R in a map displayed in the remote controller 300 (in the moving region of the robot R) (FIG. 4/STEP 301), the transiting area/starting-terminal point recognizing unit 110 of the controller 100 of the robot R, at that timing, recognizes the designated target position as the terminal point TP, and the designated nodes NS or links RS as the designated transiting area. Further, the transiting area/starting-terminal point recognizing unit 110 recognizes the departure position which is the current position (latitude, longitude) of the robot R estimated on the basis of a GPS signal received from a satellite by a GPS receiver (not shown) as the internal state sensor 111, or output signals from a gyro sensor and an acceleration sensor as the internal state sensor 111, as the starting point PP (FIG.

4/STEP 110). In the case where the user individually inputs the departure position of the robot R, the departure position is used as the starting point PP, in place of the current position.

Figure 4:
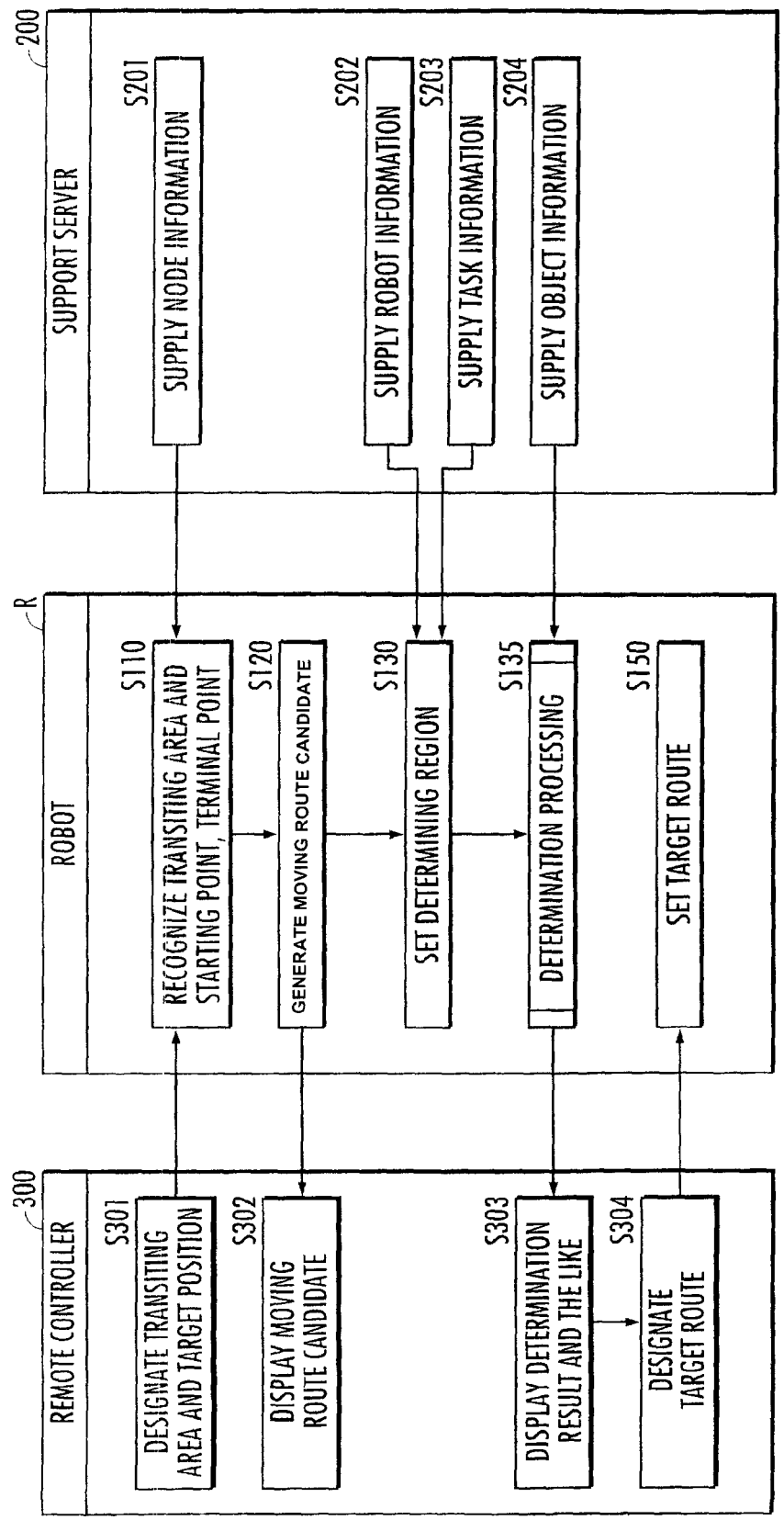
FIG. 4 is a block diagram indicating the processing at the controller and the support server.

For example, as is shown in FIG. 7(a), when the target position (TP) of the robot R and two nodes NS1, NS2, and one link RS as the designated transiting area are designated by the user (FIG. 4/STEP 301), the transiting area/starting-terminal point recognizing unit 110 recognizes the terminal point TP as the target position, two nodes NS1, NS2 and one link RS as the designated transiting area, and the starting point PP as the departure position (current position) (FIG. 4/STEP 110).

Further, for example as is shown in FIG. 8(a), even if the terminal point TP and the starting PP are the same, in the case where two differing nodes NS1', NS2' are designated as the designated transiting area, this two nodes NS1', NS2' are recognized as the designated transiting area.

Subsequent to the processing in STEP 110, the route candidate generating unit 120 of the controller 100 generates the moving route candidate connecting the terminal point and the starting point, so as to include the designated transiting area recognized by the transiting area/starting-terminal point recognizing unit 110 at least in a part thereof (FIG. 4/STEP 120). The moving route candidate is generated as the shortest route connecting the terminal point and the starting point, while satisfying a condition that the nodes and the links that are designated as the designated transiting area by the user are included therein. Therefore, the moving route candidate is generated at this point in time, regardless of whether or not the nodes and the links designated by the user as the designated transiting area overlaps with the object (refer to shaded area in FIG. 7(a) through FIG. 12).

For example, as is shown in FIG. 7(a), in the case where two nodes NS1, NS2, and one link RS are designated as the designated transiting area, the route that passes the designated transiting area and at the same time the shortest route connecting the terminal point TP and the starting point PP is generated as the moving route candidate L (FIG. 4/STEP 120), as is shown in FIG. 7(b). In this case, the moving route candidate L overlaps with the object at the designated link RS.

On the other hand, as is shown in FIG. 8(a), in the case where two nodes NS1', NS2' are designated as the designated transiting area, the route that passes the designated transiting area and at the same time the shortest route connecting the target point TP and the starting point PP is generated as the moving route candidate L' (FIG. 4/STEP 120), as is shown in FIG. 8(b).

In order to execute the recognition processing of the designated transiting area and the starting point and the terminal point by the transiting area/starting-terminal point recognizing unit 110 (FIG. 4/STEP 110), and the generation processing of the moving route candidate by the route candidate generating unit 120 (FIG. 4/STEP 120), the controller 100 of the robot R arbitrarily receives supply of information in relation to the nodes in the moving region of the robot R, from the first storing unit 211 of the support server 200 (FIG. 4/STEP 201).

When the moving route candidate is generated by the route candidate generating unit 120 (FIG. 4/STEP 120), the generated moving route candidate is transmitted to the remote controller 300, and the moving route candidate as is shown in FIG. 7(b) or FIG. 8(b) is indicated in a display of the remote controller 300 not shown (FIG. 4/STEP 302).

Subsequent to the processing of STEP 120, the determining unit 130 of the controller 100 sets the determining region corresponding to the moving route candidate (FIG. 4/STEP 130). The determining region set herein is a region defined by a first predetermined width along the moving route candidate, and a second predetermined width in a direction orthogonal to the moving route candidate. The first predetermined width is decided in accordance with a changing pattern of a moving velocity of the robot R in the moving route candidate, and is a region extended in the direction of movement from each point on the moving route candidate. The second predetermined width is decided in accordance with a swinging width of the robot R in its traverse direction, and is a region extended in the lateral direction with respect to the moving route.

Specifically, as is shown in FIG. 6(a), the determining region A1 in the case where the robot R moves in a straight line according to the moving route candidate L1, is defined as a region extended in front of the point P1 by the first predetermined width m1 decided in accordance with the moving velocity of the robot R at the position P1, and at the same time as a region extended in the lateral direction at the point P1 with respect to the moving route candidate L1 by the second predetermined width n1 decided in accordance with the swinging width of the robot R in its traverse direction.

On the other hand, the determining region A2 in the case of executing a task of approaching a cart D along the moving route candidate L2, as is shown in FIG. 6(b), is defined as a region extended in front of the point P1 by the first predetermined width m2 decided in accordance with the moving velocity of the robot R at position P2, and at the same time a region extended in the lateral direction at the point P2 with respect to the moving route candidate L2 by the second predetermined width n2 decided in accordance with the swinging width of the robot R in the traverse direction.

The case shown in FIG. 6(a) is a case where the robot R is running in a straight line, and the moving velocity at the point P1 is great compared to the case where the robot R decelerates and approaches the cart D as is in the case shown in FIG. 6(b). Therefore, the first predetermined width m1 at the point P1 is larger than the first predetermined width m2 at the point P2. Further, the case shown in FIG. 6(a) is a case where the robot R is running in a straight line, and the swinging width of the hands 14 of the robot R is large compared to the case where the robot R decelerates and approaches the cart D as is in the case shown in FIG. 6(b). Therefore, the second predetermined width n1 at the position P1 is larger than the second predetermined width n2 at the point P2.

As is shown above, by making a region having the first predetermined width along the moving route candidate as the determining region, it becomes possible to easily determine the possibility of contact between the robot R and the object existing in the forward region of the robot R. Further, a braking distance of the robot R differs from the moving velocity thereof. Therefore, it becomes possible to determine the possibility of contact harmonizing with the actual moving state of the robot, by variably setting the first predetermined width in accordance with the changing pattern of the moving velocity of the robot R.

Further, by making a region having the second predetermined width in the direction orthogonal to the moving route candidate as the determining region, it becomes possible to easily determine the possibility of contact between the robot R and the object existing at the side of the robot R. Still further, the swinging width of the robot R at the side of the robot differs, for example, in accordance with the task (approaching an object, transferring a cart, delivering a package, giving directions, answering questions, and the like). By variably setting the second predetermined width in accordance with the swinging width of the robot, it becomes possible to determine the possibility of contact harmonizing with the condition of the robot.

In order to execute the setting processing of the determining region by the determining unit 130 (FIG. 4/STEP 130), the controller 100 of the robot R receives the supply of information concerning the existence range of the robot R in the anteroposterior direction, lateral direction, and the vertical direction, from the third storing unit 213 of the support server 200 (FIG. 4/STEP 202), and receives the supply of task information concerning the task that the robot R is performing or which is scheduled to be performed by the robot R from the task database 220 of the support server 200 (FIG. 4/STEP 203).

When the determining region is set by the processing of STEP 130, the determining unit 130 determines the possibility of contact between the robot R and any object existing in the moving region, in the case where the robot R is made to move along the moving route candidate generated in the processing of STEP 120 (FIG. 4/STEP 135).

Figure 5:
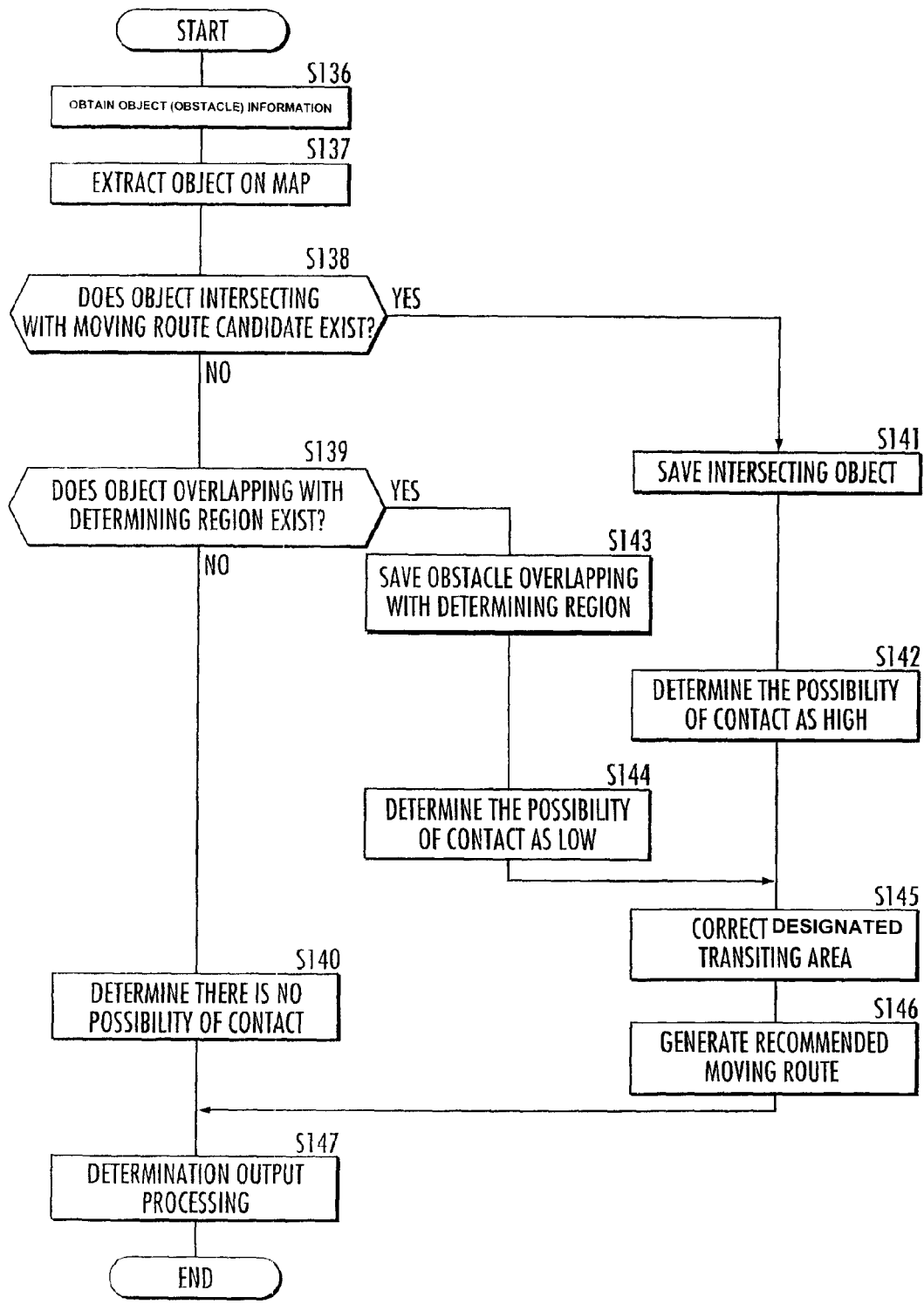
FIG. 5 is a flow chart indicating a determination processing at the controller.
Figure 6:
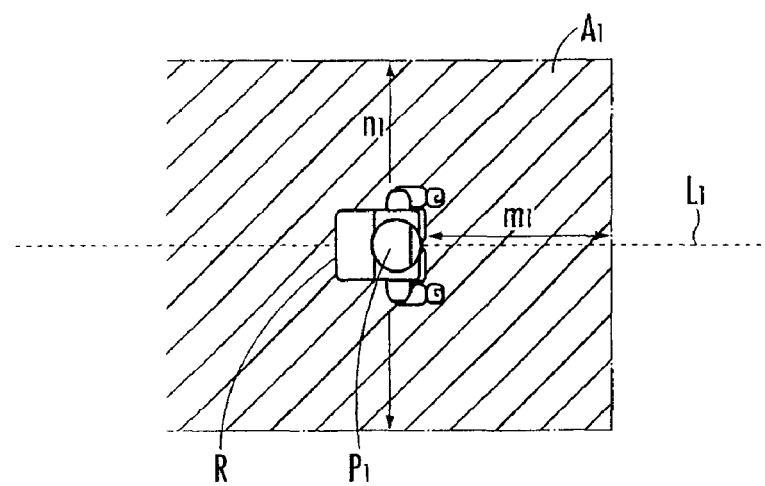
FIG. 6 is an explanatory view indicating the contents of a setting processing of a determining region.
Figure 6:
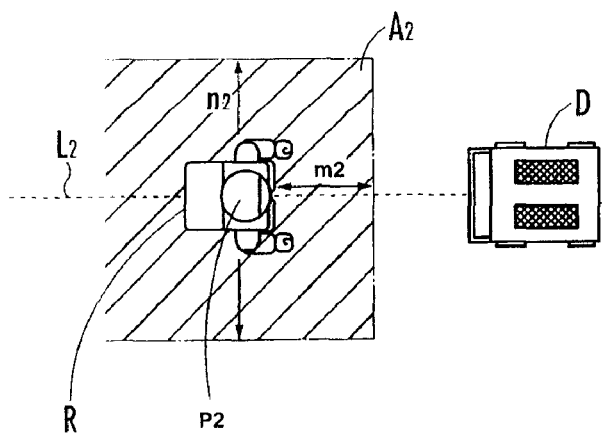

Specifically, in the determination processing, the existence or nonexistence of the possibility of contact between the robot R and any object existing in the determining region, and the level of the possibility of contact, is determined according to the flow chart shown in FIG. 5.

First, the determining unit 130 obtains information concerning the position and the existence range of the object in the moving region of the robot R, from the second storing unit 212 of the support server 200 (FIG. 5/STEP 136 (FIG. 4/STEP 204)).

Subsequent to the processing in STEP 136, the determining unit 130 extracts the object in the moving region (FIG. 5/STEP 137), and determines whether or not there exists the object in which an object region defined by the position and the existence range of the extracted object and the moving route candidate generated at STEP 120 intersects (FIG. 5/STEP 138).

In the case where the object in which the object region and the moving route candidate intersects does not exist as a result of determination in STEP 138 (NO in FIG. 5/STEP 138), the determining unit 130 determines whether or not there exists an object (obstacle) in which the determining region set in STEP 130 and the object region overlaps (FIG. 5/STEP 139).

In the case where the obstacle in which the determining region and the object region overlaps does not exist as a result of determination in STEP 139 (NO in FIG. 5/STEP 139), the determining unit 130 determined that there is no possibility of contact in the case where the robot R is made to move along the moving route candidate (FIG. 5/STEP 140). Thereafter, the determination result that there is no possibility of contact is transmitted to the remote controller 300 (STEP 147).

On the other hand, in the case where there exists the object in which the object region and the moving route candidate intersects as the result of determination in STEP 138 (YES in FIG. 5/STEP 138), the determining unit 130 stores the intersecting object temporarily in a memory of the controller 100 not shown (FIG. 5/STEP 141), and determines that the possibility of contact is high in the case where the robot R is made to move along the moving route candidate (FIG. 5/STEP 142).

Figure 7:
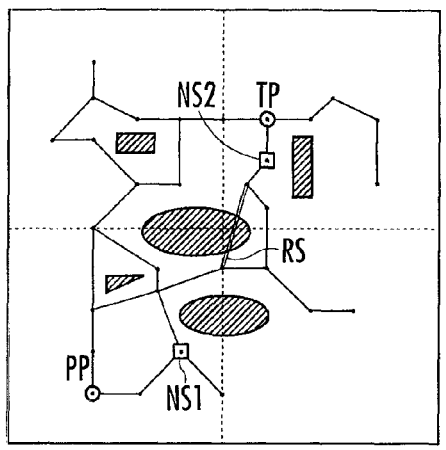
FIG. 7 is an explanatory view indicating the contents of the determination processing.
Figure 7:
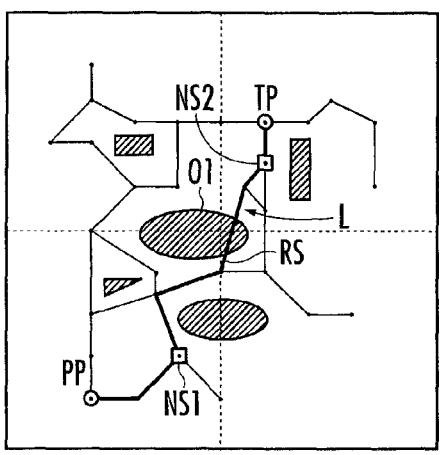
Figure 7:
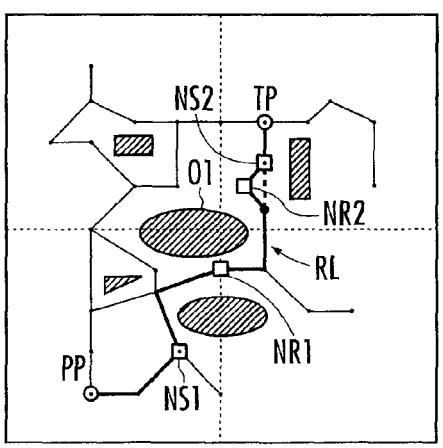

For example, in the case where the object O1 is extracted with respect to the moving route candidate L, as is shown in FIG. 7(*b*), the object region of the object O1 and the moving route candidate L intersects at the designated link RS (YES in FIG. 5/STEP 138). Therefore, the determining unit 130 stores the object O1 in the memory (FIG. 5/STEP 141), and determines that the possibility of contact of the moving route candidate L is high (FIG. 5/STEP 142).

Subsequent to the processing in STEP 142, the determining unit 130 corrects the designated transiting area recognized in STEP 110 (FIG. 5/STEP 145). Specifically, the determining unit 130 reads out from the memory the object having high (or low in the processing subsequent to STEP 144) possibility of contact, and specifies the node or the link corresponding to the intersecting portion between the object region of the object and the moving route candidate (or the portion overlapping between the object region of the object and the determining region in the processing subsequent to STEP 144). Thereafter, the determining unit 130 deletes the specified node or link from the designated transiting area, and the avoided nodes are set as the new designated transiting area.

Subsequent to the processing in STEP 145, the determining unit 130 makes the route candidate generating unit 120 generate a recommended moving route on the basis of the corrected designated transiting area (FIG. 5/STEP 146).

For example, in the case where the object O1 intersects with respect to the moving route candidate L at the designated link RS, as is shown in FIG. 7(*b*), the determining unit 130 sets the nodes at both ends of the link RS as the new designated transiting areas NR1 and NR2, in place of the link RS (FIG. 5/STEp 145), as is shown in FIG. 7(*c*). Thereafter, the route candidate generating unit 120 generates the recommended moving route RL passing the designated transiting areas NS1, NS2, NR1, and NR2 (FIG. 5/STEP 146). The recommended moving route RL is not the shortest route transiting the designated transiting areas NS1 and NS2 (dotted line in the figure), but is generated so as to transit the new designated transiting area NR2. Therefore, it becomes possible to make the route transit the point desired by the user as much as possible.

Subsequent to the processing in STEP 147, the determining unit 130 outputs the determination result that the possibility of contact is high (or low in the processing subsequent to STEP 144), information of the object having the possibility of contact which is stored in the memory of the controller 100, and the recommended moving route to the remote controller 300 (FIG. 5/STEP 147).

On the other hand, in the case where there exists the obstacle in which the determining region and the object region overlaps as a result of the determination in STEP 139 (YES in FIG. 5/STEP 139), the determining unit 130 stores the obstacle overlapping with the determining region temporarily in the memory of the controller 100 (FIG. 5/STEP 143), and determines that the possibility of contact when the robot R is made to move along the moving route candidate is low (FIG. 5/STEP 144).

Figure 8:
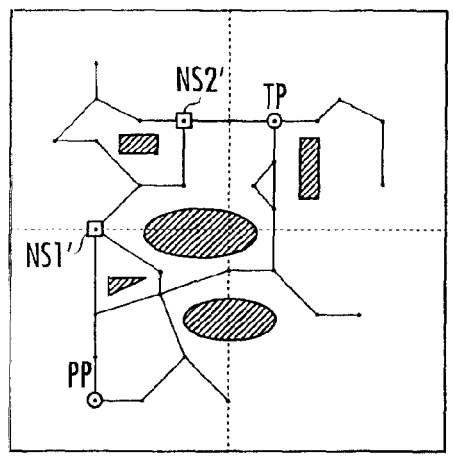
FIG. 8 is an explanatory view indicating the contents of the determination processing.
Figure 8:
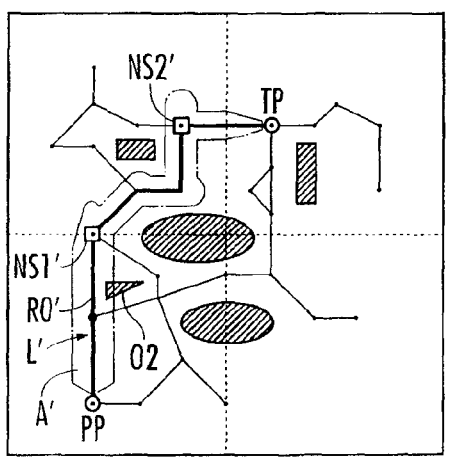
Figure 8:
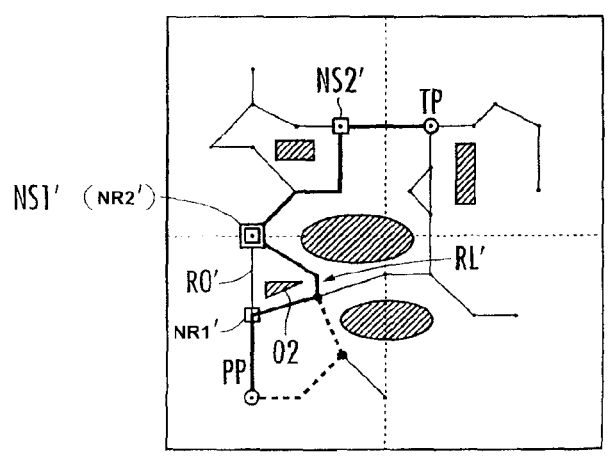

For example, in the case where the object O2 is extracted with respect to the moving route candidate L', as is shown in FIG. 8(*b*), the object region of the object O2 and the moving route candidate L' do not overlap, but the determining region A' of the moving route candidate L' and the object region of the object O2 overlap. Therefore, the determining unit 130 stores the object O2 in the memory (FIG. 5/STEP 143), and determines that the possibility of contact of the moving route candidate L' is low (FIG. 5/STEP 144).

Subsequent to the processing in STEP 144, the determining unit 130 corrects the designated transiting area recognized in STEP 110, as is explained above (FIG. 5/STEP 145). In this case, the determining unit 130 reads out the object having low possibility of contact from the memory, and specifies the node or the link corresponding to the portion in which the object region of the object overlaps with the determining region. Thereafter, the specified node or link is deleted from the designated transiting area, and the avoided nodes are set as the new designated transiting area. Further, subsequent to the processing in STEP 145, the determining unit 130 makes the route candidate generating unit 120 generate the recommended moving route on the basis of the corrected designated transiting area, as is explained above (FIG. 5/STEP 146).

For example, in the case where the object O2 overlaps with the determining region A' at the link RO' with respect to the moving route candidate L', as is shown in FIG. 8(b), the determining unit 130 sets the nodes at both ends of the link RO' as the new designated transiting areas NR1' and NR2', in place of the link RO' (FIG. 5/STEP 145), as is shown in FIG. 8(c). Thereafter, the route candidate generating unit 120 generates the recommended moving route RL' which passes the designated transiting areas NS1', NS2', NR1', and NR2' (FIG. 5/STEP 146). The recommended moving route RL' is not any other route transiting the designated transiting areas NS1' and NS2' (for example, the dotted line in the figure), but is generated so as to transit the new designated transit area NR1'. Therefore, it becomes possible to make the route transit the point desired by the user as much as possible.

In this case, subsequent to the processing in STEP 147, the determining unit 130 outputs the determination result that the possibility of contact is low, information of the object having the possibility of contact which is stored in the memory of the controller 100, and the recommended moving route to the remote controller 300 (FIG. 5/STEP 147).

Thereafter, the determining unit 130 terminates the determination processing (FIG. 4/STEP 135) of executing a series of processing in STEP 136 through STEP 147.

When the remote controller 300 receives the determination result and the like from the controller 100, the remote controller 300 displays the determination result and the like with respect to the moving route candidate to the display not shown (FIG. 4/STEP 303).

Specifically, in the case where the remote controller 300 receives the determination result that the possibility of contact is high when the robot R is made to move along the moving route candidate, a warning indicating that the setting of the moving route candidate as the target route should be cancelled is displayed on the remote controller 300. On the other hand, in the case where the remote controller 300 receives the determination result that the possibility of contact is low when the robot R is made to move along the moving route candidate, then a reminder indicating that it is possible to set the moving route candidate as the target route but attention must be paid is displayed on the remote controller 300. Further, in the case where there is no possibility of contact when the robot R is made to move along the moving route candidate, an indication that there is no possibility of contact is displayed on the remote controller 300.

In addition to displaying the determination result, in the case where the remote controller 300 receives the determination result that there is high or low possibility of contact, the object having possibility of contact which is transmitted from the controller 100 is displayed on the display of the remote controller 300.

For example, in the case where the object O1 intersects with respect to the moving route candidate L at the designated link RS, as is shown in FIG. 7(b), the object O1 is highlighted. By doing so, it becomes possible to make the user recognize the intersecting position of the moving route candidate L and the object O1.

In the case where the object O2 overlaps with the determining region A' at the link RO' with respect to the moving route candidate L', as is shown in FIG. 8(b), the object O2 is highlighted. By doing so, it becomes possible to make the user recognize the overlapping position of the determining region A' and the object O2.

Further, in the case where the remote controller 300 receives the determination result that the possibility of contact is high or low, the recommended moving route transmitted from the controller 100 is displayed on the display of the remote controller 300.

For example, in the case where the object O1 intersects with respect to the moving route candidate L at the designated link RS, as is shown in FIG. 7(b), the recommended moving route RL shown in FIG. 7(c) is displayed. Further, in the case where the object O2 overlaps with the determining region A' at the link RO' with respect to the moving route candidate L' as is shown in FIG. 8(b), the recommended moving route RL' shown in FIG. 8(c) is displayed.

When the determination result and the like is displayed on the display of the remote controller 300 (FIG. 4/STEP 303), the user selects the moving route candidate or the recommended moving route, and designates the same as the target route (FIG. 4/STEP 304).

When the target route is designated in STEP 304, the controller 100 sets the same as the target route (FIG. 4/STEP 150). In the case where the moving route candidate is set as the target route, the controller 100 requires the same to be determined that the possibility of contact is low or there is no possibility of contact. By doing so, it becomes possible to surely prevent the user from unexpectedly setting the moving route candidate having high possibility of contact as the target route, even in the case where the user tries to do so.

Thereafter, the control processing for making the robot R move autonomously according to the set target route is executed, and the robot may be made to move while transiting the points desired by the user as much as possible, to the extent that the robot avoids contact with the object.

In the present embodiment, the determining region corresponding to the moving route candidate is set. However, it is not limited thereto, and the determining region may be set so as to expand the object region. Known various methods may be used as the method of expanding the object region. For example, a Minkowski sum of the existing range of the robot R and the existence range of the object may be set as the determining region.

Further, in the present embodiment, the target route setting support system is configured from the controller 100, the support server 200 and the remote controller 300 of the robot R, however, a part of or all of these components may be mounted on any of the controller 100, the support server 200 and the remote controller 300. For example, the controller 100 may be equipped with the remote controller 300, and the support server 200 may be equipped with the remote controller 300. Similarly, the support server 200 may be equipped with the controller 100 and the controller 100 may be equipped with the support server 200.

The invention claimed is:

1. A target route setting support system for supporting an user in setting a target route for a robot autonomously moving according to the target route, the system including at least one processor, the at least one processor comprising:
    a first storing unit which stores a position of a plurality of nodes preliminarily set in a moving region of the robot;
    a second storing unit which stores information related to a position and an existence range of an object in the moving region of the robot;
    a starting point recognizing unit which recognizes a current position or a departure position of the robot in the moving region as a starting point;
    a terminal point recognizing unit which recognizes a target position of the robot in the moving region designated by the user via an input device as a terminal point;
    a transiting area recognizing unit which recognizes, of the plurality of nodes stored in the first storing unit, the node or a link connecting nodes together which is designated by the user via the input device as a designated transiting area;

a route candidate generating unit which generates a moving route candidate connecting the terminal point recognized by the terminal point recognizing unit and the starting point recognized by the starting point recognizing unit, the moving route candidate generated such that the designated transiting area recognized by the transiting area recognizing unit is included as at least part of the moving route candidate; and a determining unit which determines a level of or an existence or nonexistence of a possibility of contact between the robot and the object, in the case where the robot is made to move along the moving route candidate generated by the route candidate generating unit, according to whether or not a predetermined condition is satisfied in light of information concerning the position and the existence range of the object stored in the second storing unit, and which outputs the determination result via an output device;

wherein the moving route candidate generated by the route candidate generating unit is allowed to be set as the target route, on condition that it is determined by the determining unit that the predetermined condition is not satisfied and the possibility of contact is therefore low or nonexistent.

2. The target route setting support system according to claim 1, wherein the determining unit determines that the possibility of contact is high when the predetermined condition is satisfied, the predetermined condition is a condition that the moving route candidate generated by the route candidate generating unit intersects with an object region defined by the existence range of the object at the position of the object stored in the second storing unit.

3. The target route setting support system according to claim 2, wherein the determining unit presents an intersecting position between the moving route candidate and the object region, when it is determined that the possibility of contact is high.

4. The target route setting support system according to claim 2, wherein the at least one processor further comprises a recommended route generating unit which generates a recommended moving route connecting the terminal point recognized by the terminal point recognizing unit and the starting point recognized by the starting point recognizing unit, so as to avoid an intersecting position between the moving route candidate and the object region, and also to include as much of the designated transiting area recognized by the transiting area recognizing unit as possible while avoiding the intersecting position, in place of the moving route candidate, when it is determined by the determining unit that the possibility of contact is high.

5. The target route setting support system according to claim 1, wherein the at least one processor further comprises a third storing unit which stores an existence range of the robot, and the determining unit sets a determining region having an existence range corresponding to the existence range of the robot stored in the third storing unit along the moving route candidate, and determines that the possibility of contact exists when the predetermined condition is satisfied, the predetermined condition is a condition that the determining region overlaps with an object region defined by the existence range of the object at the position of the object stored in the second storing unit.

6. The target route setting support system according to claim 5, wherein the determining unit determines, in the case where it is determined that the possibility of contact exists, the possibility of contact to be high when the moving route candidate generated by the route candidate generating unit intersects with the object region, the possibility of contact to be low when the moving route candidate generated by the route candidate generating unit does not intersect with the object region.

7. The target route setting support system according to claim 5, wherein the determining unit presents an overlapping position between the determining region and the object region, when it is determined that the possibility of contact exists.

8. The target route setting support system according to claim 5, wherein the determining unit is equipped with a recommended route generating unit which generates a recommended moving route connecting the terminal point recognized by the terminal point recognizing unit and the starting point recognized by the starting point recognizing unit, so as to avoid an overlapping position between the determining region and the object region, and also to include as much of the designated transiting area recognized by the transiting area recognizing unit as possible while avoiding the overlapping position, in place of the moving route candidate, when it is determined that the possibility of contact exists.

9. The target route setting support system according to claim 5, wherein the determining region is a region having a first predetermined width along the moving route candidate, and the first predetermined width is variably set in accordance with a changing pattern of a moving velocity of the robot.

10. The target route setting support system according to claim 5, wherein the determining region is a region having a second predetermined width in a direction orthogonal to the moving route candidate, and the second predetermined width is variably set in accordance with a swinging width in a traverse direction of the robot.

11. The target route setting support system according to claim 6, wherein the determining unit presents an overlapping position between the determining region and the object region, when it is determined that the possibility of contact exists.

12. The target route setting support system according to claim 6, wherein the determining unit is equipped with a recommended route generating unit which generates a recommended moving route connecting the terminal point recognized by the terminal point recognizing unit and the starting point recognized by the starting point recognizing unit, so as to avoid an overlapping position between the determining region and the object region, and also to include as much of the designated transiting area recognized by the transiting area recognizing unit as possible while avoiding the overlapping position, in place of the moving route candidate, when it is determined that the possibility of contact exists.

13. The target route setting support system according to claim 6,
wherein the determining region is a region having a first predetermined width along the moving route candidate, and the first predetermined width is variably set in accordance with a changing pattern of a moving velocity of the robot.

14. The target route setting support system according to claim 6,
wherein the determining region is a region having a second predetermined width in a direction orthogonal to the moving route candidate, and the second predetermined width is variably set in accordance with a swinging width in a traverse direction of the robot.

15. The target route setting support system according to claim 1, wherein the route candidate generating unit generates the moving route candidate such that the designated transiting area recognized by the transiting area recognizing unit is included as only part of the moving route candidate.

16. The target route setting support system according to claim 2, wherein the route candidate generating unit generates the moving route candidate such that the designated transiting area recognized by the transiting area recognizing unit is included as only part of the moving route candidate.

17. The target route setting support system according to claim 6, wherein the route candidate generating unit generates the moving route candidate such that the designated transiting area recognized by the transiting area recognizing unit is included as only part of the moving route candidate.

18. The target route setting support system according to claim 1, wherein the plurality of nodes are set in predetermined positions in the moving region irrespective of the starting point recognized by the starting point recognizing unit and the terminal point recognized by the terminal point recognizing unit, and
the route candidate generating unit generates the moving route candidate as a path connecting the terminal point to the starting point via at least one of the plurality of nodes.

19. The target route setting support system according to claim 1, further comprising:
a remote controller separate from the robot, the remote controller including the input device and the output device.

* * * * *